United States Patent

Schipper et al.

[11] Patent Number: 5,892,454
[45] Date of Patent: Apr. 6, 1999

[54] HYBRID MONITORING OF LOCATION OF A SITE CONFINEE

[75] Inventors: John F. Schipper, Palo Alto; James M. Janky, Los Altos, both of Calif.

[73] Assignee: Trimble Navigation Ltd., Sunnyvale, Calif.

[21] Appl. No.: 734,721

[22] Filed: Oct. 21, 1996

Related U.S. Application Data

[63] Continuation-in-part of Ser. No. 171,228, Dec. 21, 1993, Pat. No. 5,568,119.

[51] Int. Cl.$^6$ .................................................. G08B 21/00
[52] U.S. Cl. .............................. 340/825.37; 340/825.49; 340/870.01; 340/539; 340/572; 340/573; 340/825.54; 342/357; 342/450; 379/38
[58] Field of Search .................... 340/825.37, 825.49, 340/870.01, 539, 572, 573, 825.54; 379/38; 342/357, 450

[56] References Cited

U.S. PATENT DOCUMENTS

| | | | |
|---|---|---|---|
| 4,209,787 | 6/1980 | Freeny, Jr. | 340/346 |
| 4,918,425 | 4/1990 | Greenberg et al. | 340/539 |
| 4,918,432 | 4/1990 | Pauley et al. | 340/573 |
| 4,924,211 | 5/1990 | Davies | 340/573 |
| 5,014,040 | 5/1991 | Weaver et al. | 340/572 |
| 5,196,825 | 3/1993 | Young | 340/539 |
| 5,218,344 | 6/1993 | Ricketts | 340/573 |
| 5,268,670 | 12/1993 | Brasch et al. | 340/541 |
| 5,627,520 | 5/1997 | Grubbs et al. | 340/572 |

*Primary Examiner*—Michael Horabik
*Assistant Examiner*—Yonel Beaulieu
*Attorney, Agent, or Firm*—John Schipper

[57] ABSTRACT

Method and apparatus for monitoring present location of a person ("confinee") who is to be confined to a designated site, which site can have a diameter as small as a few meters or as large as several kilometers. The present location of the confinee is checked at selected time intervals with time periods ranging from one second to thousands of seconds, as desired. The confinee wears a location-determining ("LD") unit that receives electromagnetic signals that contain information allowing determination of the present location of the LD unit, and thus of the confinee, from three or more non-collinear outdoor LD signal sources and from three or more non-collinear indoor LD signal sources. The indoor LD signal sources may be radiowave transmitters. The outdoor LD signal sources may be transmitters for a Loran, Omega, Decca, Tacan, JTIDS Relnav or PLRS or similar ground-based system, or transmitters for a satellite positioning system, such as GPS or GLONASS. The relative phases or transmission times for the signals from each indoor LD signal source are determined and provided for the LD unit. The present location or change location of the LD unit is determined and compared with the permitted site location coordinates at a sequence of selected times to determine if the confinee is present at the site at such times. The LD unit issues an alarm signal if the confinee is not on the site and has not arranged beforehand to leave the permitted site for a selected time interval. [The permitted site can be redefined, for a selected time interval, to include the first permitted site, a second permitted site and a corridor extending between the first and second permitted sites for a selected time interval, after which the permitted site can be changed again to include only the first or the second permitted site or a portion thereof. [This allows the confinee to temporarily leave the original permitted site to seek medical attention or to attend to other needs, or to be moved permanently to the second site.] The permitted site can be redefined at any time and for any subsequent time interval. One or more exclusion sites can be designated where the confinee is not permitted to go at any time.]

18 Claims, 7 Drawing Sheets

HYBRID MONITORING OF LOCATION OF A SITE CONFINEE

This application is a continuation in part of a patent application, "Arrestee Monitoring With Variable Site Boundaries," U.S. Ser. No. 08/171,228, filed 21 Dec. 1993, now U.S. Pat. No. 5,568,119, and assigned to the same assignee as this application.

FIELD OF THE INVENTION

This invention relates to monitoring the location of site confinees in an arbitrarily defined area, using radiowave communications.

BACKGROUND OF THE INVENTION

The annual growth of the population of prisoners within the state and federal prisons in the United States has averaged a few percent per year for the last ten years. The total number of such prisoners and jail cell occupants exceeds 2 million. All felons convicted and sentenced for a crime are placed in one or another of these prisons, with little regard for the severity of the crime, whether the crime involved actual or threatened violence, or whether the crime was primarily directed against property. This approach has several disagreeable consequences. First, the federal and state governments cannot build prisons fast enough to accommodate the growing prison population, and some courts are treating prison overcrowding as a violation of the prisoners' constitutional rights. Second, the amount of money spent on new prisons, estimated to be $80,000–100,000 per cell, is now a substantial part of the annual budget of state and federal governments. Third, prisons must be built in relatively large sizes to obtain economies of scale so that siting of such prisons is often a problem. Fourth, the average cost of providing room, board, recreation and security for a prisoner is now estimated to be about $8,000–12,000 per year, and this cost increases with inflation. Fifth, prisoners convicted of non-violent crimes are usually thrown together with, and are often preyed upon by, prisoners convicted of violent crimes. Sixth, prisoners who might still work and make a positive contribution to society are discouraged or prevented from doing so because of a lack of facilities needed for such activities.

Some workers have conceived other ways of handling some of these problems by providing portable jail or prison cells or by providing monitoring tags that must be worn by the prisoners. One early device, disclosed in U.S. Pat. No. 3,478,344, issued to Schwitzgebel et al, provides an omnidirectional transceiver carried on the waist and an encoded oscillator, uniquely identifying the wearer, that communicates with the transceiver. An inmate or other supervised person in a mental institution or a prison wears this apparatus, which receives signals transmitted from a nearby central station that interrogates the wearer's unit concerning the location of the unit. The unit responds automatically. The method used for determination of location of the wearer's unit might be triangulation, which would require provision of at least three additional stations. Miller, in U.S. Pat. No. 4,495,496, discloses a similar approach for locating miners working in different shafts in a mine. Maletta discloses a similar approach, using signal strength monitoring, in U.S. Pat. No. 4,973,944. Davies, in U.S. Pat. No. 4,924,211, and Ricketts, in U.S. Pat. No. 5,218,344, disclose approaches using transceivers that are similar to that of Schwitzgebel et al.

Schlatter et al, in U.S. Pat. No. 3,722,152, disclose a portable jail cell that can be transported as a disassembled unit and then assembled and used within a jail or other designated security area. The cell walls and floor are made of metal and concrete, and two or more such portable cells can be placed side-by-side to conserve space. A portable cell must be placed within a jail or other secured facility to provide overall security.

In U.S. Pat. No. 4,571,904, Kessler et al disclose a patient enclosure, to be placed within, and form part of, a hospital room, that operates similarly to the portable cell of Schlatter et al. The patient enclosure is a separate room-within-a-room that is cleared of all furniture except the patient's bed, may include padding on the walls, and is intended to be used for patients with brain damage who must be protected from further injury by their own actions.

A personnel monitoring system that uses the telephone for communication between the person whose location is monitored and a central station is disclosed in U.S. Pat. No. 4,747,120, issued to Foley. The monitored person wears a bracelet and is occasionally required to take some action, such as insertion of the bracelet into a decoder that transmits a coded verification signal to the central station over a dedicated phone line that is enabled only when used. The system is provided with some means that does not allow transmission of false signals to the central station. A similar approach, requiring periodic voice verification from the monitored person, is disclosed by Sloan et al in U.S. Pat. No. 5,023,901.

Watson, in U.S. Pat. No. 4,777,477, discloses a location surveillance system for a designated person, such as a parolee, that detects departure of that person from a designated site, such as an enclosed building. The person wears a sensor-transmitter, a wrist band and a current-carrying loop wrapped around the body. The sensor senses when the person leaves the building and causes the transmitter to broadcast an alarm that is received by a receiver located within the building. The system senses an attempt to remove the loop from the body, using strain gauge apparatus, and transmits another alarm signal.

A house arrest monitoring system, using an identification tag that is worn near the flesh of the prisoner under house arrest, is disclosed in U.S. Pat. No. 4,918,432, issued to Pauley et al. A tag worn by a prisoner transmits a signal having a unique code portion that identifies that prisoner so that several prisoners can be sequestered at one site. A field monitoring device (FMD), connected to a telephone line, receives and analyzes these transmitted signals and determines if (1) the prisoner is present at the site and (2) the tag is being continuously worn near the flesh of the wearer. If one or the other of these conditions is not true, the FMD communicates this information to a central processing unit (CPU), using the telephone line, and personnel at this CPU respond accordingly. The intensity of the signal transmitted by the tag may be improved using a signal repeater to communicate with the FMD. One CPU is used to monitor the locations of prisoners at one or several house arrest sites. The presence of a prisoner at the site is determined primarily by receipt of a tag signal having that prisoner's code included. A prisoner, wearing a tag, could move away from the site a considerable distance before the FMD would sense this, because the location of a tag cannot be determined with much accuracy.

U.S. Pat. No. 4,952,928, issued to Carroll et al, discloses a presence monitoring and identification system, including a body condition sensor and transponder to be worn by the monitored person. In response to receipt of a radiowave request, the transponder transmits a signal to a field monitoring device (FMD), identifying the wearer and including information sensed by the body sensor, such as heart rate, skin perspiration, muscle movement, etc. The FMD is located near where the monitored person should be and periodically transmits to a central station body information on, and the location of, the monitored person. The system is intended to monitor the condition and location of a person under house arrest.

Williamson et al, in U.S. Pat. No. 4,999,613, disclose a remote confinement system in which a sequence of different, unsupervised tests are conducted on prisoners confined at a site. The tests are intended to determine the identity of a prisoner, whether a given person is present or absent at the site, and certain characteristics of the conduct of a prisoner at the site (e.g., a prisoner's sobriety). A radio transmitter, worn on the leg of each prisoner, transmits signals containing these data, and the data are received by an adjacent home monitoring unit, then relayed over a telephone line to a central station where these data are collected and analyzed. The present location of a prisoner cannot be accurately determined, for reasons similar to those that characterize the Pauley et al invention discussed above. U.S. Pat. No. 4,843,377, issued to Fuller et al, discloses a system that is similar to the Williamson et al patent, using breath alcohol testing and body fluid testing and verification of the prisoner identity by voice print, graphic image matching or other means.

U.S. Pat. No. 5,052,048, issued to Heinrich for a crime deterrent system, discloses passive pursuit of a suspected perpetrator of a recent crime. Each of a plurality of citizens is provided with a short range FM or AM radio transmitter, tuned to a selected frequency for communication with a central control station. These citizens are alerted to the presence of the suspected perpetrator by a broadcast from the central station. Each such citizen that sights the suspected perpetrator transmits a report to the central station, indicating the suspected perpetrator's present location and direction of movement. The central station maps the movement of the suspected perpetrator and moves to apprehend that person.

A personnel monitoring tag with tamper detection for a person under house arrest is disclosed by Bower et al in U.S. Pat. No. 5,075,670. The tag contains a small radio transmitter that intermittently broadcasts a relatively weak signal that is received by a receiver located on the assigned site. If the arrestee leaves the site, the broadcast signal will become weaker and eventually will not be received by the receiver, in which event an alarm can be given. The tag is provided with a tamper detection circuit. The tag broadcasts a normal signal when the tag has not been tampered with and broadcasts a distinguishable tamper signal when tampering is detected. This apparatus has many interesting features, but it cannot accurately determine the location of an arrestee or detect whether the arrestee stays within a boundary defining the designated site.

A tamper indicator system including a conductive strap that is placed around a limb of a house arrestee is disclosed in U.S. Pat. No. 5,117,222, issued to McCurdy et al. When the strap is put into place, electricity is conducted through a circuit and causes a pulse counter to decrement to a selected minimum number, such as zero, over an initial strap placement period. If tampering or attempted strap removal occurs during this initial strap placement period, a transmitter notifies a monitoring person of this event. Other tamper indicator systems are disclosed by McCurdy et al in U.S. Pat. Nos. 4,980,671 and 5,471,197 and by Gilmore et al in U.S. Pat. No. 5,298,884.

Moore et al, in U.S. Pat. No. 5,121,096, disclose a person locator system that includes an appliance to be worn by a child or by a person with impaired senses. The appliance carries its own power supply and transmits a visual signal and an audible signal (70 dB at 2500 Hz) at selected times, such as every five seconds. The audible signal can, allegedly, be heard at 300 feet. However, this only locates the person wearing the appliance within a circle of area about 283,000 square feet, and the area covered is limited by long-term tolerance for high intensity sounds (about 85 dB). Further, this requires that a another person continuously monitor the varying level of the audible sound periodically emitted by the appliance.

Henry et al, disclose an electronic house arrest system that uses optical links and infrared communications, in U.S. Pat. No. 5,146,207. A prisoner wears apparatus that serves as transmitter and as receiver, using two concealed apertures in the apparatus. This apparatus communicates with a field monitoring device (FMD) that, in turn, communicates with a central station that receives and analyzes the data collected by the FMD. Data collected and the means of communication (telephone or modem) are similar to those disclosed in the Pauley et al patent.

In U.S. Pat. No. 5,170,426, D'Alessio et al disclose a home incarceration system that incorporates voice analysis and verification over a telephone line. The voice of a prisoner who is added to this home arrest system is initially tested to establish a voice template that subsequently can be used to verify voice communication over a phone line by that prisoner. The prisoner communicates with a central office at irregular times by phone calls, and central office apparatus verifies the location and identity of the call responder (prisoner), using the voice template and other characteristics. The location of the prisoner during the time intervals between these phone calls is not determined with this system.

An electronic house arrest system disclosed by Mitchell in U.S. Pat. No. 5,189,395 allows silent calls for assistance from a monitoring officer who makes personal and/or telephone-assisted checks of the presence and identity of prisoners at designated sites. In other respects, this system is similar to the system disclosed in the Pauley et al patent.

A telephone-based home incarceration system in which the prisoner wears a bracelet or other appliance is disclosed by Goudreau et al in U.S. Pat. No. 5,206,897. The bracelet contains an electrical circuit that has specified electrical characteristics that are monitored by an adjacent comparator circuit. If the sets of electrical characteristics do not match, indicating that the prisoner may be absent from the site of incarceration, a central station is notified by phone and appropriate action is taken. Verification of the presence and identity of the prisoner must be requested by placing a telephone call to the prisoner, who then places the bracelet in a special fixture to implement comparison of the electrical characteristics. This verification procedure probably could not be done more often than about once per hour, if the central office has many prisoners to monitor using this system.

Melton et al disclose use of a cellular interface unit for an electronic house arrest system, in U.S. Pat. No. 5,255,306. A field monitoring device (FMD) is positioned at the house arrest site and receives low power, uniquely tagged signals transmitted by a tamper-proof house arrest appliance worn by the arrestee. The FMD monitors the strength of the signals received from the appliance. When the signal strength falls below a selected threshold, the monitoring system determines that the arrestee has moved off the site, and a cellular phone network is used to alert the proper authorities at a central station. The FMD signal threshold is typically set corresponding to a separation distance of 150 feet and cannot distinguish from which direction the signals arrive.

An electronic surveillance system for monitoring compliance with a protective order and associated exclusion zone is disclosed by Carroll et al in U.S. Pat. Nos. 5,266,944 and 5,396,227. The monitored person and the exclusion zone must each be fitted with electronic devices that communicate when the devices are near each other.

Hinkle, in U.S. Pat. No. 5,396,215, discloses an electronic system for defining an exclusion zone around the driver's seat in an automobile, targeting a person who is not permitted to drive the automobile.

U.S. Pat. No. 5,497,149, issued to Fast, discloses a GPS-based personal security system in which the location of a selected person (primarily outdoors) is monitored at or near allowed areas and unallowed areas. A cellular data or voice channel is used to communicate useful information, such as an alarm signal, to a monitoring station.

FM subcarrier signals and AM carrier signals have been used for some types of radiowave communications. In U.S. Pat. No. 3,889,264, Fletcher discloses a vehicle location system in which the unsynchronized AM carrier signals from three or more AM radio stations form hyperbolic isophase grid lines that are used to determine location of a vehicle. The vehicle must be equipped with a three-channel, tunable receiver, and its location must be referenced to an initial known location by counting the number of isophase lines crossed after the vehicle leaves the initial location. Isophase drift is compensated for by subtraction from the count.

Dalabakis et al, in U.S. Pat. No. 4,054,880, disclose a radio navigation and vehicle location system employing three low frequency subcarrier signals received from three radio stations at a three-channel, tunable receiver located on the vehicle. Isophase lines crossed are counted after the vehicle leaves an initial known location. This system, like the Fletcher system, is a delta-position system that determines vehicle location only relative to an initially known location.

U.S. Pat. No. 4,646,290, issued to Hills, discloses use of F.C.C.-approved Subsidiary Communication Authorization (SCA) FM subcarrier signals for one way transmission. This patent discloses transmission of a plurality of messages, which may be delivered to the transmitter at a wide range of bit rates, to be transmitted at a single bit rate that is at least as large as the highest bit rate for message delivery. This method allows for downstream insertion of additional data.

An integrated radio location and communication system for a mobile station is disclosed by Martinez in U.S. Pat. No. 4,651,156. Each mobile station carries a transceiver that issues radio signals that are received by two or more signal transceiver reference sites having fixed, known locations. The transceivers at the mobile station and the reference stations are continuously phase locked to the RF carrier signal from a nearby commercial radio station. The radio station and the mobile station each transmit a brief, distinguishable range tone at a known sequence of times, and the range tone from each station is received by each reference station. From an analysis of the differences in arrival times of the range tones received from the radio station and from the mobile station, the reference stations determine the two-dimensional location of the mobile station. The mobile station uses the beat signal between two RF subcarrier frequencies to generate its range tone signal and to distinguish that mobile station transmissions from the transmissions of any other mobile station.

Young et al, in U.S. Pat. No. 4,660,193, discloses use of two SCA FM subcarrier signals, the first being amplitude modulated and the second being phase modulated, to provide a digital data transmission system. A subcarrier signal within this system may also be modulated to carry audio signals.

A multichannel FM subcarrier broadcast system that provides a sequence of relatively closely spaced channels, using independent sidebands of suppressed carriers, is disclosed by Karr et al in U.S. Pat. No. 4,782,531. The sideband signals are generated in pairs and are phase shifted before transmission. Upon receipt of the transmitted signals, the process is reversed. An earlier patent, U.S. Pat. No. 3,518,376, issued to Caymen and Walker, discloses a similar approach without use of signal phase shifting of pairs of sideband signals.

In U.S. Pat. No. 4,799,062, Sanderford et al disclose a radio location method that uses a central processing station, a plurality of signal repeater base stations with fixed, known locations, and a mobile station with a known location at any time. The central station transmits a master grid synchronization pulse, which serves as a time reference, to the other stations at a selected sequence of times. A roving station with unknown location transmits a pulse that is received by three or more base stations and is retransmitted to the central station. The central station determines the location of the roving station using the differences in time of arrival at each base station of the pulse transmitted by the roving station. The mobile station also transmits a pulse from time to time, and its known location is compared with its computed location by the central station to determine any multipath compensation required to reconcile the known and computed locations of the mobile station. The multipath compensation for a mobile station adjacent to the roving station is applied to correct the computed location of the roving station.

Ma, in U.S. Pat. No. 4,816,769, discloses receipt of SCA FM subcarrier signals for digital data paging at a radio receiver. The system measures signal-to-noise ratio of an output amplitude of a Costas loop, used to phase lock to the FM subcarrier frequency, to determine if the signal is sufficiently strong to be processed.

A system for detection of radiowave propagation time, disclosed by Ichiyoshi in U.S. Pat. No. 4,914,735, uses detection of phase differences for transmission of the signal over M ($\geq 2$) different known signal paths to a target receiver. The transmitted signal includes a subcarrier signal, having a frequency that is higher than the transmitter clock frequency, modulated with a known modulation signal. The receiver has M demodulators for the signals received by the M different paths and has a phase comparator to compare the computed phases for each of these received signals. The phase differences are proportional to the signal path length differences, if compensation for transmission line distortions is included.

U.S. Pat. No. 5,023,934, issued to Wheeless, discloses a system for communication of graphic data using radio subcarrier frequencies. The data are broadcast on a subcarrier channel and received by a radio receiver that is connected to a computer. The computer receives the subcarrier signals, displays the graphic data on a computer screen, and performs other functions, such as transmission error checking and modification of the displayed graphic data. The system is intended for weather data communication and display.

Westfall, in U.S. Pat. No. 5,073,784, discloses a system for location of a transmitter ("unknown") at large distances, using a large network of pairs of spaced apart radiowave receivers whose locations are known and whose relative phases are synchronized. A signal, broadcast by the unknown transmitter at less than HF frequencies, is received at different time and space points by pairs of receivers. Simple geometrical computations allow determination of the location of the unknown transmitter by comparing times of arrival of the transmitted signal.

U.S. Pat. No. 5,170,487, issued to Peek, discloses use of FM sub-carrier signals for a pager system for mobile users. A plurality of transmitters are used, each of which transmits an FM subcarrier signal or a carrier signal modulated with a chosen message signal, slightly offset in time. Each page-receiving unit is assigned a time slot, during which the receiving unit dials through the set of frequencies corresponding to the FM subcarrier and modulated-carrier signals to determine if a page message has been sent for that mobile user.

A system that allows determination of an absolute location of a vehicle is disclosed by Kelley et al in U.S. Pat. Nos. 5,173,710, 5,280,295 and 5,499,032. FM subcarrier signals are received from three radio stations with known locations but unknown relative phases by signal processors at the vehicle and at a fixed station with known location relative to the three radio stations. The fixed station processor determines the relative phases of the three radio stations FM subcarrier signals and broadcasts this relative phase information to the vehicle. The vehicle processor receives this relative phase data and determines its absolute location, using the phases of the FM signals it senses at its own location.

Chon, in U.S. Pat. No. 5,193,213, discloses an FM broadcast band system for receipt of relatively high frequency FM subcarrier signals. A tunable high pass receiver first circuit receives the carrier and a tunable low pass second circuit receives the subcarrier signal. Each signal can then be separately processed.

A navigation and tracking system using differential LORAN-C or differential Decca signalling is disclosed by Duffett-Smith in U.S. Pat. No. 5,045,861. A reference station transmits a reference signal to a mobile station and to three or more local LORAN-C or Decca (fixed) stations having known locations relative to the reference station. The fixed stations retransmit the reference signal to the mobile station, where the phase received signal differences are compared to determine the location of the mobile station.

Most of these systems use a single communication system, rather than integrating two or more communication systems to provide location or navigation information for a mobile user. What is needed is an integrated location determination system for automatically or discretionarily determining the present location of a mobile user at a designated site, whether the user is presently outside or inside a building or other structure. Preferably, the system should include an appliance to be worn or carried by a prisoner, arrestee or confinee (collectively referred to as an "confinee" herein) that will: (1) allow a selected confinee to live on one or more designated sites outside a conventional confinement facility for at least a portion of his/her confinement time; (2) detect with reasonable accuracy the present location of the confinee at arbitrarily chosen times with time interval lengths as short as one second; (3) detect when the confinee crosses a designated boundary and attempts to leave a designated site and provide a first alarm at that time; (4) detect when tampering with the appliance is occurring and provide a second alarm; (5) allow the confinee to leave the designated site at prescribed times to seek medical attention or attend to other needs, while continuing to monitor the present location of the confinee; (6) allow certain geographic regions, from which the confinee is to be excluded, to be defined by electromagnetic signals; and (7) allow easy and flexible redefinition of a boundary of a designated site.

SUMMARY OF THE INVENTION

These needs are met by the invention, which provides a system and associated apparatus that allows a confinee to be confined to a designated site outside a conventional prison or other confinement facility for at least a portion of the designated confinement time. The confinee wears an appliance, including a location determination (LD) unit and a radiowave transmitter and power supply, that cannot be removed, except by specially trained persons, and that provides information on the confinee's present location at each of a sequence of time intervals that may vary in length from a fraction of a second to hundreds or thousands of seconds, as desired. This LD unit receives radiowave or similar signals that provide information used to determine the present location of the LD unit, and of the wearer thereof. The inaccuracy of this present location information is preferably no greater than one to three meters indoors or outdoors.

In one embodiment, the LD unit processes this information, determines this present location, and transmits this information to a central station that monitors the present location of one or many confinees, each of whom may be located at a single site or at separate sites. In another embodiment, the LD unit does not process this information, or partly processes this information, and transmits this information to the central station for further processing to determine the present location of the confinee. The central station compares the present location of the confinee with the designated confinement site and with the site boundary to determine if the confinee is staying on this site. If the confinee has moved off the site without prearranged permission, or if no intelligible response signal is received at the proper time, the central station promptly notifies the appropriate authorities. Alternatively, the central station can activate some portion of the appliance worn by the confinee and temporarily disable the confinee until the authorities arrive.

Optionally, the LD unit contains a tamper detection circuit that transmits a distinguishable alarm if tampering is detected. Optionally, the appliance transmits the present location information in an encrypted form that cannot be read or interfered with by the confinee, except by making the transmitted signal unintelligible and thus triggering an alarm at the central station.

The LD unit worn by the confinee may receive and process "indoor" LD signals from a plurality of three or more radiowave transmitters, having known locations and determinable phase relationships. These indoor signal sources are located inside or adjacent to a building or other signal-sheltering structure that might interfere with signals received from outside the structure. The phase differences of the radiowave signals provide information to determine the present location of the LD unit relative to the LD signal sources.

Alternatively, the LD unit may receive LD signals from an "outdoor" LD signal source, including a plurality of three or more ground-based location determination signal sources, such as Loran, Omega, Decca, Tacan, JTIDS Relnav, PLRS or FM subcarrier signals, or including a plurality of three or more satellite-based location determination signal sources (SATPS), such as GPS or GLONASS, with known locations and determinable phase relationships, using phase analyses similar to or different from analyses used for the indoor LD signals. Other sets of three or more radiowave signals with known source locations and selected signal parameters may also be used. An indoor LD signal unit and an outdoor LD signal unit are integrated in a compact LD unit that receives and processes indoor LD signals and outdoor LD signals substantially simultaneously. The central station or another station can serve as a reference station and the appliance can serve as a mobile station in a differential positioning mode using the outdoor LD system. A transmitter or transceiver and associated antenna connected to the LD unit (1) periodically transmits information on the confinee present location and/or (2) transmits such information after receipt of an location interrogation signal (LIS) at random and unpredictable times and/or (3) transmits such information by "exception reporting," that is, only when some predetermined condition is violated, such as confinee location being outside the permitted confinement site.

DESCRIPTION OF BEST MODES OF THE INVENTION

Figure 1:
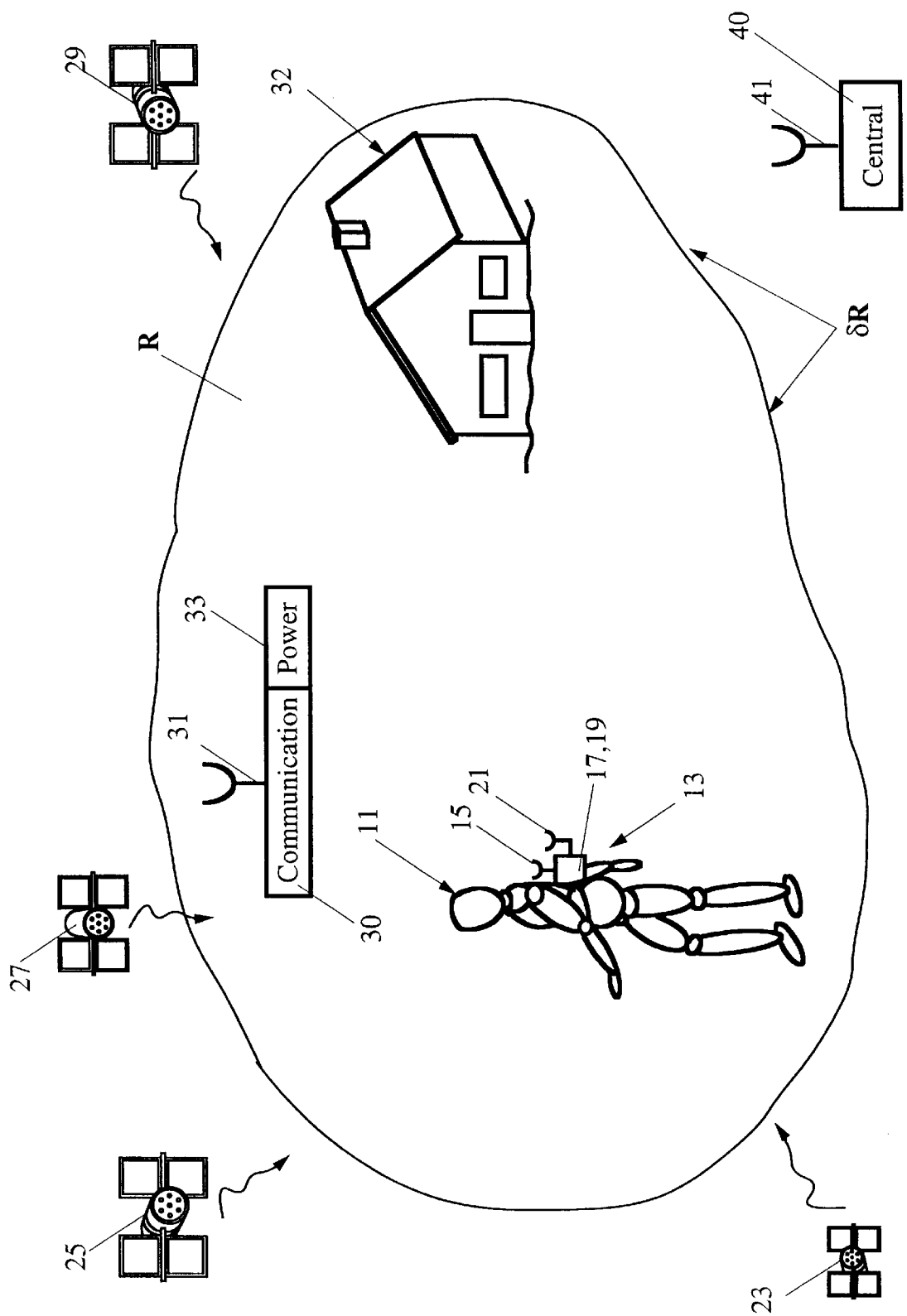
FIG. 1 is a schematic view of operation of an embodiment of the invention on and near a designated confinement site, illustrating possible locations of outdoor LD signal sources.

FIG. 1 illustrates practice of one embodiment of the invention. A site confinee 11 lives and works at or is confined to a designated confinement site or region R having a boundary $\delta R$. The confinee 11 wears a portable location determination (LD) unit 13, including an outdoor and indoor LD signal antenna 15, an outdoor and indoor LD signal receiver/processor 17, a communications transmitter or transceiver 19 (referred to herein as a "transmitter" for convenience) connected to the LD signal receiver/processor, and a communications antenna 21 serving the transmitter 19. The LD unit 13 receives and processes outdoor LD signals from three or more outdoor LD signal sources 23, 25, 27, 29 that have locations with known location coordinates $(x_m, y_m, z_m)$ for LD signal source no. m (m=23, 25, 27, 29). The outdoor LD signal sources may be ground-based signal sources that are part of a Loran, Omega, Decca, Tacan, JTIDS Relnav, PLRS or FM subcarrier signal system, or may be part of a satellite-based position determination system (SATPS), such as GPS or GLONASS. The LD unit 13 also receives and processes indoor LD signals from a plurality of indoor LD signal sources (discussed later in connection with FIG. 2) that may be located within or adjacent to a building or other signal-sheltering structure that might interfere with signal reception from sources outside the structure.

The confinee 11 wears an appliance including the LD unit 13 strapped or otherwise bound to the confinee's body and monitored by a tamper-resistant circuit, such as those disclosed by McCurdy et al in U.S. Pat. Nos. 4,980,671, 5,117,222 and 5,471,197, by Bower et al in U.S. Pat. No. 5,075,670, and by Gilmore et al in U.S. Pat. No. 5,298,884, discussed above. If the confinee or any other person or entity attempts to remove, alter or interfere with operation of the appliance or with the binding to the confinee's body, the appliance transmits an alarm signal to the central station and may take other action as well.

The LD unit 13 receives the outdoor LD signals and/or the indoor LD signals, determines which of the sets of LD signals shall be used to determine the location of the LD unit, processes the LD signals and determines the LD unit present location, and optionally stores and/or transmits this location information directly or indirectly to a central station 40 that is usually spaced apart from the confinement site R. Alternatively, the LD unit 13 partially processes the LD signal information and optionally stores and/or transmits this partially processed or unprocessed location information to the central station 40, for further processing and review of the present location of the LD unit 13.

If the LD unit fully processes the LD signal information and thereby determines the LD unit present location in real time, with a time delay of at most a few seconds for signal processing, the LD unit may adopt any or all of several options for reporting to the central station 40. (1) The transmitter 17 may periodically transmit present location information on the confinee 11 to the central station. Preferably, this present location information is based only on the set of LD signals (outdoor or indoor) chosen for location determination. However, the transmitter 17 may transmit the confinee present location information determined by each of the outdoor LD signals and the indoor LD signals, together with an indication of which set of LD signals was chosen by the LD unit 13. The period selected for LD unit present location information reporting may range from one second to several minutes or more, depending in part on the behavior of the confinee and the circumstances.

(2) The transmitter 17 may transmit present location information on the confinee 11 after receipt of a location interrogation signal (LIS), which signal is received at random and unpredictable times so that the confinee is never certain when the LD unit present location will be reported. Time separation of two consecutive LISs may range from one or a few seconds to several minutes or more.

(3) The transmitter 17 may adopt exception reporting and report confinee present location only when this location is outside the confinement site R, absent receipt of prior approval to move outside the site for a designated purpose. Optionally, the transmitter 17 may transmit an alarm signal, in addition to or in place of the present location information signal, when the LD unit present location is found to be outside the confinement site R.

(4) As a supplement, if the central station 40 does not receive K consecutive location reporting signals from the LD unit 13 worn by the confinee 11 (K a selected positive integer), the central station can transmit an alarm or otherwise alert the proper authorities to investigate and possibly apprehend the confinee.

Alternatively, information contained in the LD signals received may be transmitted unprocessed or partially processed to the central station for further processing and analysis. If this alternative is adopted, only options (1) and (2) are available for reporting this information to the central station 40. In this alternative, most or all of the functions of the outdoor LD signal receiver/processor 17 (and the indoor LD signal receiver/processor as well) can be deleted at the LD unit 13, depending upon what part of the LD signal processing is completed at the central station.

The LD unit 13 may communicate directly with the central station 40, using the communications transmitter 19 and associated communications antenna 21 that is part of the LD unit. However, this approach may require a larger power supply for the LD unit, because electrical power of the order of one to ten Watts may be required here if the central station 40 is spaced apart from the confinement site R by a distance of one to several miles. Alternatively and preferably, the transmitter 19 transmits information to, and receives information from, an intermediate transceiver 30 and associated antenna 31 that are located on or near the site R. The intermediate transceiver 30 and antenna 31 are preferably located at a fixed place, outdoors or within a building or other structure 32 on the site R, and are provided with a suitably large power supply 33 so that the intermediate transceiver 30 and associated antenna 31 can communicate information on the LD unit present location and any other suitable information to the central station 40. The central station 40 can also communicate any suitable information, such as a location interrogation signal (LIS) to the LD unit 13, using the intermediate transceiver 30 and associated antenna 31 as an intermediary. The intermediate transceiver 40 may be part of a Ricochet radio packet communications system, available from Metricom, San Jose, Calif.

Because the outdoor LD signals use a high frequency carrier (above 1 GHz for GPS and GLONASS signals), these outdoor LD signals may be severely attenuated and/or distorted if such signals are received inside a building or other structure that is partly or fully electromagnetically insulated. For this reason, receipt and analysis of outdoor LD signals may be unsuitable for determination of the LD unit present location , when the LD unit antenna 15 is positioned within such a building or similar structure. However, the combined use of indoor LD signals, for location determination inside a building or similar structure (e.g., a deep shaft mine or tunnel under or through the Earth), plus use of outdoor LD signals, for location determination outside such a structure or within a non-electromagnetically insulated structure, can provide a satisfactory LD system in most urban and non-urban communities. In some circumstances, GPS signals have been satisfactorily received within a building and have been used to obtain satisfactory location coordinates for the GPS signal antenna within such building. However, in other circumstances, receipt of (attenuated and/or distorted) outdoor LD signals inside a structure may be insufficient to allow accurate determination of the location of the LD signal antenna 15.

Figure 2:
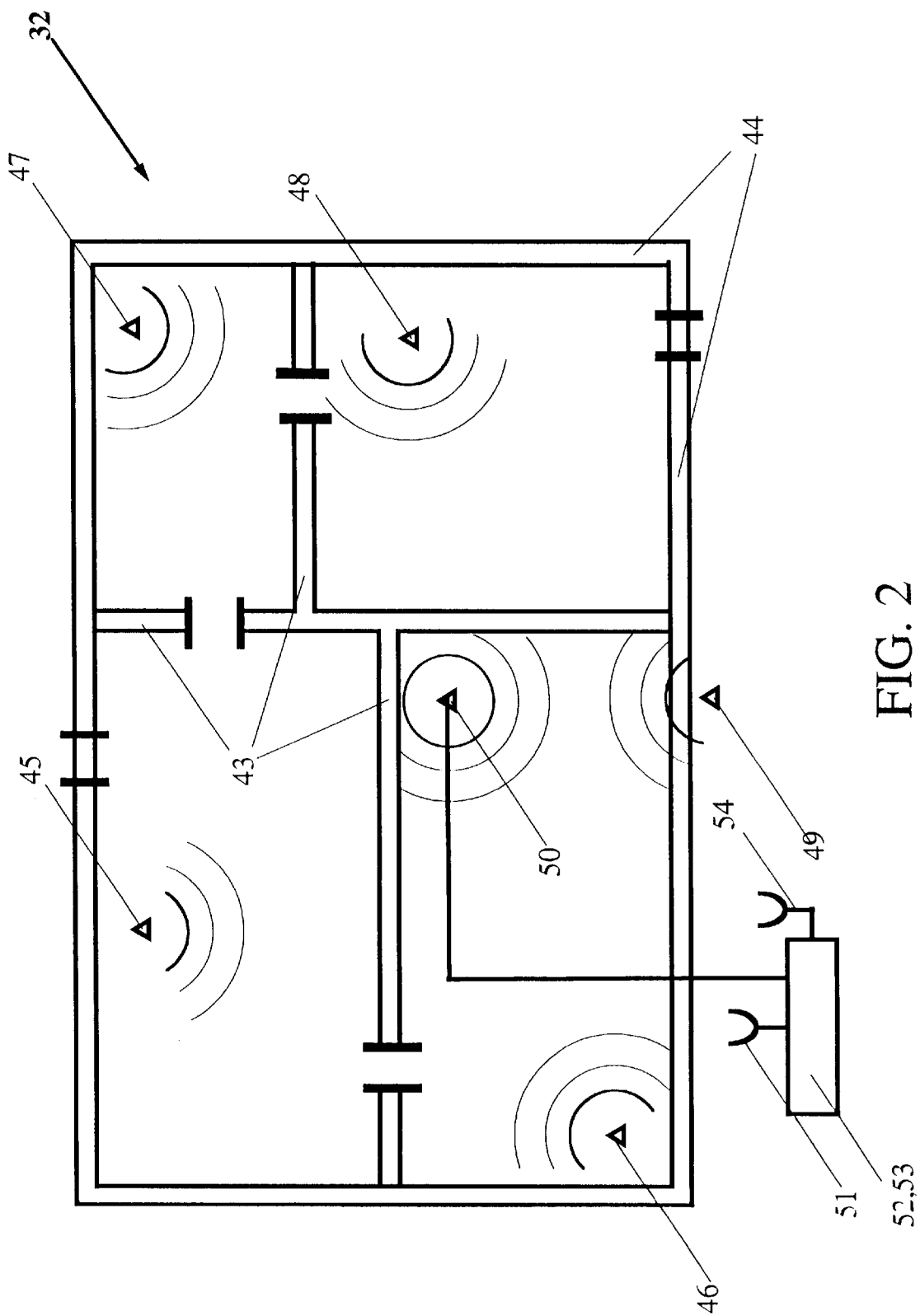
FIG. 2 is a schematic view inside a building or other structure that may be located on the confinement site, illustrating possible locations of indoor LD signal sources.

FIG. 2 is a schematic top view of a typical building or other structure 32 that may be located on the confinement site R. The structure 32 optionally has an assembly of interior walls 43 of non-zero thicknesses and an assembly of exterior walls 44 having other non-zero thicknesses. Typically, an interior wall includes two plaster or plasterboard sheets, each having a thickness of about 2 cm, with these two sheets being spaced apart by an air column that includes a small number of wooden two-by-four boards that provide support for the sheets and for other parts of the structure 32. Typically, an exterior wall is between 15 and 30 cm thick and may include plaster, chicken wire, wood, brick, stone and/or mortar.

The structure 32 has a plurality of three or more non-collinear indoor LD signal transmitters 45, 46, 47 and 48 located within the structure and optionally has one or more indoor LD signal transmitters 49 located outside and adjacent to the structure. Each transmitter 45, 46, 47, 48 and 49 has known location coordinates $(x_m, y_m, z_m)$ (m=45, 46, 47, 48, 49) and transmits a radiowave (analog or digital) signal with a known frequency, preferably less than 100 kHz, that is distinguishable from the signal transmitted by any of these other indoor LD signal transmitters. For example, the five indoor LD signal transmitters 45, 46, 47, 48 and/or 49 shown in FIG. 2 might have different selected frequencies of 75, 80, 85, 90 and 95 kHz.

Indoor LD signal transmitter number m=45, 46, 47, 48 and/or 49 may be movable from one location to another within or adjacent to the structure 32, or each transmitter may be fixed in place. If transmitter number m is moved from one location to another and refixed in place, the new location coordinates $(x_m, y_m, z_m)$ should be entered into the receiver/processor 17 of the LD unit and/or into a receiver/processor at the central station 40. One or more indoor LD signal transmitters can be located within each room of the structure 32, if desired.

Each transmitter 45, 46, 47, 48 and/or 49 transmits an indoor LD signal with low power, preferably less than one Watt, that easily passes through the interior walls 43 of the structure 32 and is received at any location, for example 11C, where the confinee 11 may be located within the structure 32. The LD unit 13 preferably has stored within it the location coordinates $(x_m, y_m, z_m)$ of each of the transmitters 45, 46, 47, 48 and/or 49, the characteristic indoor signal frequency for each of these transmitters and the phase of one or more of these indoor LD signals relative to the phase of each of the other indoor LD signals, determined at one or more selected times. The LD unit antenna 15, which may include a plurality of individual antennas for receipt of the outdoor LD signals and of the indoor LD signals, has an assembly of signal frequency filters that receive, process and discriminate between the signal frequencies of the different indoor LD signals.

Optionally, an indoor signal monitor 50, having a known location within or adjacent to the structure 32, may be provided to receive the indoor LD signals transmitted by the indoor LD transmitters 45, 46, 47, 48 and/or 49, to determine the relative phases of the indoor LD signals transmitted by the indoor LD signal transmitters, and to communicate this relative phase information to the LD unit 13. Optionally, the indoor signal monitor 50 can also transmit its own indoor LD signal that is received by the LD unit antenna 15 and can provide information to the LD unit 13 on the present phase of each of the other indoor LD signals relative to its own indoor LD signal, at one or more selected times. The relative phases of the indoor LD signals of the indoor LD signals may drift slowly or otherwise change in the course of a 24-hour day so that monitoring and restatement of these relative phases is appropriate in many situations.

The indoor LD signal monitor 50: (1) receives the indoor LD signals transmitted by the indoor LD signal transmitters 45, 46, 47, 48 and/or 49; (2) determines the relative phases of these indoor LD signals at their respective sources, using the known distances of the antennas of each of these indoor LD signal transmitters from the antenna of the indoor LD signal monitor; (3) transmits a signal on another selected frequency that advises any LD unit 13 of these relative phases; and (4) optionally transmits its own indoor LD signal, with a phase determined by an optional selected linear combination of the phases of two or more of the other indoor LD signals, or determined independently of the phases of the other indoor LD signals. The confinee 11 wears the portable LD unit 13 and is assigned an identifying indicium that is included in any communication (direct or indirect) between the LD unit and the central station 40. Optionally, the central station 40 can continually or periodically advise a communications, command and control (C3) center of the present location of the LD unit 13 worn by the confinee 11, or of the locations of several such confinees.

At or around a given time t=t0, the indoor LD signals broadcast by the indoor LD signal sources 45, 46, 47, 48 and/or 49 and by the indoor signal monitor 50 (optional) are $$S_m(t) = S_0 \exp[j(\omega_m t - \phi_m)](m=45,46,47,48,49,50)(j^2=-1), \quad (1)$$

where $\omega_m$ and $\phi_m$ are the subcarrier frequency and present phase of the indoor LD signal source number m. The indoor LD signal frequencies $\omega_m$ are preferably distinguishable and are spaced apart from one another. Optionally, the signal $S_m(t)$ may itself be modulated with a known signal to produce a signal $S_{m,mod}(t)$ that is different for each source (m) and that allows identification of each indoor LD signal source, independently of whether the indoor LD signal frequencies are distinct. The indoor LD signals are received at the LD unit 13 as time-varying signals of the form $$S'_m(t) = S_0 \exp[j(\omega_m t - \phi_m - \omega_m d_m/c')] \quad (2)$$

where c' is the average propagation velocity in the transmission medium (mostly air) and $$d_m = [(x-x_m)^2 + (y-y_m)^2 + (z-z_m)^2]^{1/2} \quad (3)$$

is the approximate distance from the indoor LD signal source number m to the LD unit 13, whose present location coordinates (x, y, z) are as yet undetermined.

If the phases $\phi_m$ are known, the distances $d_m$ can be determined from Eq. (2). From any three physically realistic three distances, such as $d_{45}$, $d_{47}$ and $d_{49}$, two candidate location coordinate triples (x,y,z) can be found that, in principle, satisfy Eqs. (3) for measured distances $d_m$ (or phases $\phi_m$). Adding the distance $d_m$ of a fourth indoor LD signal source, such as the monitor 50, will, in principle, allow elimination of one of these two candidate triples so that only one location coordinate triple (x, y, z) remains for the present location of the LD unit 13. In practice, this scheme may not work well if the four indoor LD signal sources lie approximately in a plane P or in a line and the present location of the LD device 13 also lies close to or in that plane or that line. Preferably, one of the four indoor LD signal sources, such as the source 47 or the optional indoor LD signal monitor and source 50, should be spaced far apart from the plane P passing through the locations of any three other indoor LD signal sources, such as 45, 46 and 48. This formalism can be used for any indoor LD signal sources. However, if the location of the plane P is chosen carefully, use of a fourth indoor LD signal may not be required to determine the location of the LD unit 13.

In one cycle of an indoor LD signal of frequency $f_m$ (m=45, 46, 47, 48, 49, and optionally 50), an electromagnetic wave will move a distance equal to one wavelength $\lambda = c'/2\pi f_m$, or about 3000–4200 meters in a vacuum for $f_m = 70$–100 kHz. Thus, the distance of the LD unit 13 from each indoor LD signal source is known modulo 3000–4200 meters. This distance ambiguity is not of great concern here because (1) indoor LD signals will be used inside, or outside and close to, the structure 32 and (2) a structure 32 such as a residence or other confinement facility will usually have a diameter or other linear measure of size that is at most 20–100 meters.

An indoor LD signal source number m (m=45, 46, 47, 48 and/or 49, and optionally 50) has known coordinates ($x_m$, $y_m$, $z_m$). From the determinable phase differences of the signals arriving from each indoor LD signal source at the location of the LD unit 13 with as-yet-undetermined coordinates (x,y,z) (also the present location coordinates of the confinee 11), source number m is determined to lie at a distance $d_m$ from the LD unit location. Indoor LD signals, emitted from indoor signal sources i and j, with synchronized phases, would arrive at the selected LD unit 13 location with time differences $\Delta t_{ij}$ or source-to-source phase differences $\Delta \phi_{ij}$ (i≠j; i,j=45, 46, 47, 48, 49, 50) in times of arrival that are determined by $$\Delta t_{ij} = (d_i - d_j)/c', \quad (4)$$

$$\Delta \phi_{ij} = 2\pi (d_i f_i - d_j f_j)/c', \quad (5)$$

$$d_i = [(x-x_i)^2 + (y-y_i)^2 + (z-z_i)^2]^{1/2} \quad (6)$$

where c' is the velocity of light propagation in the ambient medium and f is the frequency of the indoor LD signals. The time differences $\Delta t_{ij}$ or the phase differences $\Delta \phi_{ij}$ (i≠j; i,j=45, 46, 47, 48, 49, 50) define intersecting hyperboloids or similar quadratic surfaces, each having one or two sheets. The common intersections of groups of these hyperboloid sheets should define a point or segment of a curve, where the two points (or curve segments) are mirror images of each other with respect to the plane P(i,j,k) (k≠i,j) defined by the coordinates ($x_i,y_i,z_i$), ($x_j,y_j,z_j$) and ($x_k,y_k,z_k$) of the ith, jth and kth indoor LD signal transmitters. A fourth indoor LD signal source 50 (optional), because it is displaced from and does not lie on the plane P(i,j,k), transmits an indoor LD signal that has distinct time differences or phase differences at the two intersection points 11 and 12. This fourth indoor LD signal can thus distinguish between 11 and 12 and allow determination of the correct coordinates (x,y,z) for the location of the LD unit 13. This assumes that the phases of the indoor LD signals are synchronized, with zero phase differences or with known phase differences between any two of these signals. In practice, each of the indoor LD signal sources will have a phase that may drift with time or change abruptly at particular times.

Where the indoor LD signals have different phases, the source-to-source phase differences $\Delta \Phi_{ij}$ must be determined and removed before Eq. (4) or (5) can be used to determine the location coordinates (x,y,z) of the selected location. The phase differences $\Delta \Phi_{ij}$ can be determined by providing the indoor LD signal monitor 50 that receives the other indoor LD signals and determines the phase differences $\Delta \Phi_{i,50}$. The indoor LD signal monitor 50 uses its knowledge of the separation distances between itself and the (other) indoor LD signal sources and of the measured signal phase differences at the monitor 50 from the (other) indoor LD signals. As noted above, the phase differences $\Delta \Phi_{i,50}$ may vary with time, through drift, abrupt change, or both. The indoor LD signal monitor 50 then broadcasts the phase differences $\Delta \Phi_{i,50}$, preferably with a different carrier frequency than any indoor LD signal frequency, and these phase differences are received and stored and/or processed at the LD unit 13. The LD unit 13 also receives the indoor LD signals and determines the "raw" or uncompensated phase differences $\Delta\phi_{ij}$ at its location (i=45, 46, 47, 48, 49; j=50). An LD signal receiver/processor 17 that is part of the LD unit 13 then forms the "true" or compensated phase differences $$\Delta\phi_{i,50} = 2\pi(d_i - d_{50})/c'\Delta t - \Delta\Phi_{i,50}, \quad (i=45, 46, 47, 48, 49). \tag{7}$$

This compensates for non-synchronization and possible drifting or change of the indoor LD signals transmitted by the indoor LD signal sources. Compensation is provided with respect to one of the indoor LD signals, whose own phase may change with time.

Alternatively, the indoor LD signal monitor 50 can be deleted, and relative phase information can be provided by other approaches. Each of the indoor LD signal sources 45, 46, 47, 48 and/or 49 can reset its own phase, either periodically or at a sequence of selected times determined in part by the anticipated drift in phase at each indoor LD signal source, or by connection to a GPS antenna and receiver/processor, located outside the structure, for time synchronization.

Each time the phase of an indoor LD signal is reset, the corresponding indoor LD signal transmitter transmits a short signal that (1) identifies the indoor LD signal source and (2) indicates that the phase of this indoor LD signal source is being reset. The LD unit 13 will then assume that the phase for that indoor LD signal is equal to its reset value until a new reset value for that signal is received at a later time. These presently effective phases can be used to determine relative phases for use in the preceding determination of the location (inside the structure 32) of the LD unit 13.

Each of the indoor LD signals transmitted by each of the indoor LD signal transmitters 45, 46, 47, 48 and/or 49 may pass through one to four interior walls 43 before being received by the LD unit 13 (assumed to be located within the structure 32). Passage of an indoor LD signal through an interior wall requires passage through an estimated 4–12 cm of plaster, wood or other construction material, and such passage will delay receipt of this indoor LD signal by an estimated 0.26 nanoseconds (nsec), relative to propagation in a vacuum, based on an assumed refractive index n=1.45–1.65 for plaster or other construction material. Where signals from three independently positioned indoor LD signal sources are received and used to determine the present location of the LD unit 13, the estimated maximum error in this location is about 14 cm. This error is relatively small compared to other errors, such as clock, multipath and receiver noise errors, that may be incorporated in use of the indoor LD signals. Most of these other errors can be reduced or eliminated. This error is also small compared to the size of the structure 32, which may be 10–100 meters in diameter. It is not particularly important to accurately determine the location of the LD unit 13 within the structure 32; it is sufficient to know that the LD unit is located somewhere within the structure, because the structure itself is wholly located on the confinement site R.

The indoor LD signal monitor 50, if it is connected to an outdoor LD signal antenna 51 and associated outdoor LD signal receiver/processor 52 (optional) with known location coordinates that receives and analyzes outdoor LD signals, can also serve as an outdoor LD signal reference station, for differential position corrections that help determine the present location of the LD signal antenna 15 more precisely. Differential position corrections use the known location of the reference station to remove some of the errors contained in signals received by a mobile station, such as the LD unit 13, that is located near the reference station. These corrections are determined by comparison of the calculated location of the antenna 51, using the outdoor LD signals received at this antenna, with the known location coordinates of this antenna. Differential GPS techniques are discussed in Tom Logsdon, The NAVSTAR Global Positioning System, Van Nostrand Reinhold, 1992, pp. 76–90, and differential Loran techniques are discussed in U.S. Pat. No. 5,045,861, issued to Duffet-Smith. Information from these references is incorporated by reference herein. The indoor LD signal monitor 50 can also include a transmitter 53 and antenna 54 to transmit these correction values to the LD signal antenna 15 and receiver/processor 17 at the LD unit 13 so that most errors in the present location of the LD signal unit 13, as calculated using the outdoor LD signals, can be reduced or eliminated.

The location coordinates (x,y,z) of the LD unit 13 worn by the confinee 11 are now determinable, outdoors or inside a structure such as 32. However, some technique must be used to determine when the outdoor LD signals are to be used and when the indoor LD signals are to be used to determine these location coordinates. Several approaches are available here.

Figure 4:
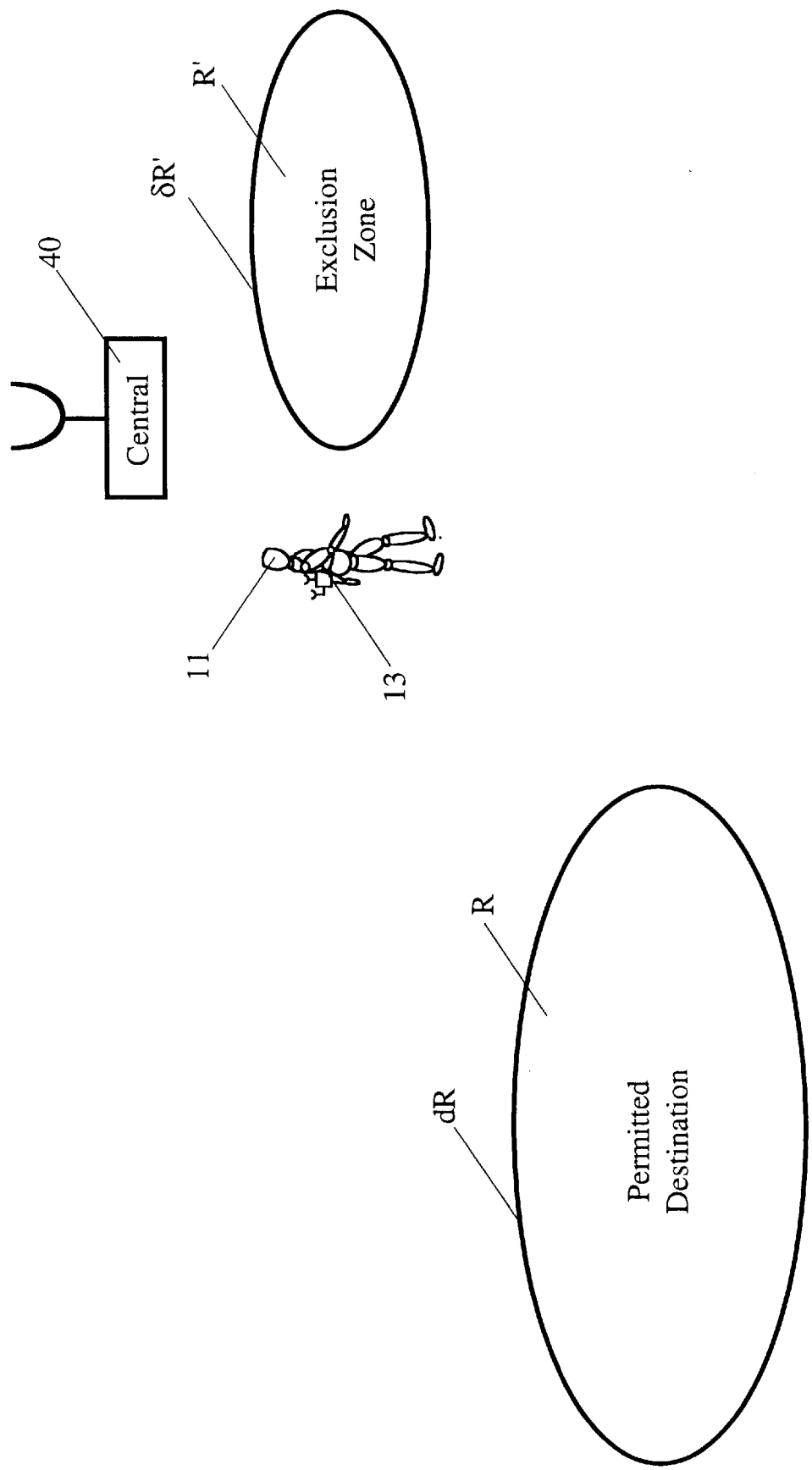
FIG. 4 is a schematic view illustrating use of the invention to provide one or more exclusion zones R' where the site confinee is not permitted to go under any circumstances.

In a first approach, a measure of signal strength SS(out) of the outdoor LD signals actually available for determination of the present location of the LD unit 13 is formed and compared with a measure of a similarly formed signal strength SS(in) of the indoor signals actually available for determination of the present location of the LD unit 13. In determining the measure of signal strength for the available outdoor LD signals, the signal strength SS(m;out) (assumed to be positive) for each of the available outdoor LD signal sources (m=1, 2, ..., N(out)) is measured, and these signal strengths are redesignated as SS(m1;out), SS(m2;out), ..., SS(mN(out);out), where $$SS(mN(\text{out});\text{out}) \leq SS(mN(\text{out})-1;\text{out}) \leq \ldots$$
$$< SS(m2;\text{out}) \leq SS(m1;\text{out}) \tag{8}$$

and (m1, m2, ..., mN(out)) is a suitable rearrangement of the N(out) signal source labels for the available outdoor LD signals. In FIG. 4, N(out) may be as high as four. The measure SS(out) of signal strength for the outdoor LD signals is then an appropriate additive or multiplicative combination of the individual signal strengths SS(mk;out) (k=1, 2, ..., N(out)), such as $$SS(\text{out}) = \sum_{k=1}^{N(\text{out})} SS(mk;\text{out})/N(\text{out}), \tag{9A}$$

or $$SS(\text{out}) = \sum_{k=1}^{p} SS(mk;\text{out})/p, \tag{9B}$$

or $$SS(\text{out}) = \left[ \prod_{k=1}^{N(\text{out})} SS(mk;\text{out}) \right]^{1/N(\text{out})}, \tag{9C}$$

or $$SS(\text{out}) = \left[ \prod_{k=1}^{p} SS(mk;\text{out}) \right]^{1/p}, \tag{9D}$$

or

-continued $$SS(\text{out}) = SS(mp;\text{out}), \quad (9E)$$

where it is assumed that at least p outdoor LD signals (mk=m1, m2, . . . , mp) are needed to determine the present location of the LD unit. In many situations, p=3.

Proceeding by analogy, the indoor LD signal strength SS(n; in) of each available indoor LD signal is measured (n=1, 2, . . . , N(in)), and these signal strengths are redesignated as SS(n1;in), SS(n2;in), . . . , SS(nN(in);in), where $$SS(nN(\text{in});\text{in}) \leq SS(n(N(\text{on})-1);\text{in}) \leq \ldots \leq SS(n2;\text{in}) \leq SS(n1;\text{in}). \quad (10)$$

The measure SS(in) of signal strength for the indoor LD signals is then an appropriate additive or multiplicative combination of the individual signal strengths SS(nk;in) (k=1, 2, . . . , N(in)), such as $$SS(\text{in}) = \sum_{k=1}^{N(\text{in})} SS(nk;\text{in})/N(\text{in}), \quad (11A)$$

or $$SS(\text{in}) = \sum_{k=1}^{q} SS(nk;\text{in})/q, \quad (11B)$$

or $$SS(\text{in}) = \left[ \prod_{k=1}^{N(\text{in})} SS(nk;\text{in}) \right]^{1/N(in)}, \quad (11C)$$

or $$SS(\text{in}) = \left[ \prod_{k=1}^{q} SS(nk;\text{in}) \right]^{1/q}, \quad (11D)$$

or $$SS(\text{in}) = SS(nq;\text{in}), \quad (11E)$$

where it is assumed that at least q indoor LD signals (nk=n1, n2, . . . , nq) are needed to determine the present location of the LD unit. In many situations, q=3.

The outdoor LD signals and the indoor LD signals are received and processed by different receiver/processor hardware and/or software so that different minimum signal strengths, SS(min;out) and SS(min;in), of the individual outdoor LD signals and of the indoor LD signals may be needed to adequately determine the LD unit present location. If an adequate number p of outdoor LD signals are available, but fewer than q indoor LD signals, are available for determination of the LD unit present location, the outdoor LD signals (only) are used for this purpose. If an adequate number q of indoor LD signals are available, but fewer than p outdoor LD signals, are available for determination of the LD unit present location, the indoor LD signals (only) are used for this purpose. If an adequate number (at least p) of outdoor LD signals and an adequate number (at least q) of indoor LD signals are available for determination of the LD unit present location: (1) the outdoor LD signals are used to determine the LD unit present location if $$SS(\text{out})/SS(\text{min};\text{out}) > SS(\text{in})/SS(\text{min};\text{in}); \quad (12A)$$

(2) the indoor LD signals are used to determine the LD unit present location if $$SS(\text{out})/SS(\text{min};\text{out}) < SS(\text{in})/SS(\text{min};\text{in}); \quad (12B)$$

and (3) a selected combination the LD unit present location, based on the outdoor signals only, and the LD unit present location, based on the indoor LD signals only, is used for an optimized LD unit present location if $$SS(\text{out})/SS(\text{min};\text{out}) = SS(\text{in})/SS(\text{min};\text{in}). \quad (12C)$$

(4) The system declines to determine the LD unit present location if an adequate number (at least p) of outdoor LD signals is not available and an adequate number (at least q) of indoor LD signals is not available.

In a second approach, a measure of signal quality SQ(out) of the outdoor LD signals actually available for determination of the present location of the LD unit 13 is formed and compared with a measure of a similarly formed signal quality SQ(in) of the indoor signals actually available for determination of the present location of the LD unit 13. One measure of signal quality uses the signal-to-noise ratios SNR(mk;out) and SNR(nk;in) (assumed to be positive) of each the outdoor LD signals and each of the indoor LD signals, respectively, with mk=m1, . . . , mN(out) and nk=n1, . . . , N(in) as in the preceding discussion of signal strength. Five suitable measures of signal quality for the outdoor LD signals are $$SQ(\text{out}) = \sum_{k=1}^{N(\text{out})} SNR(mk;\text{out})/N(\text{out}), \quad (13A)$$

or $$SQ(\text{out}) = \sum_{k=1}^{p} SS(mk;\text{out})/p, \quad (13B)$$

or $$SQ(\text{out}) = \left[ \prod_{k=1}^{N(\text{out})} SNR(mk;\text{out}) \right]^{1/N(out)}, \quad (13C)$$

or $$SQ(\text{out}) = \left[ \prod_{k=1}^{p} SNR(mk;\text{out}) \right]^{1/p}, \quad (13D)$$

or $$SQ(\text{out}) = SNR(mp;\text{out}), \quad (13E)$$

where it is again assumed that at least p outdoor LD signals (mk=m1, m2, . . . , mp) are needed to determine the present location of the LD unit.

Five suitable measures of signal quality for the indoor LD signals are $$SQ(\text{in}) = \sum_{k=1}^{N(\text{out})} SNR(nk;\text{in})/N(\text{in}), \quad (14A)$$

or $$SQ(\text{in}) = \sum_{k=1}^{q} SS(nk;\text{in})/q, \quad (14B)$$

or $$SQ(\text{in}) = \left[ \prod_{k=1}^{N(\text{in})} SNR(nk;\text{in}) \right]^{1/N(in)}, \quad (14C)$$

or

-continued $$SQ(\text{in}) = \left[ \prod_{k=1}^{q} SNR(nk;\text{in}) \right]^{1/q}, \quad (14D)$$

or $$SQ(\text{in}) = SNR(nq;\text{in}), \quad (14E)$$

where it is again assumed that at least q indoor LD signals (nk=n1, n2, ..., nq) are needed to determine the present location of the LD unit.

As noted above, the outdoor LD signals and the indoor LD signals are received and processed by different receiver/processor hardware and/or software so that different minimum signal qualities, SQ(min;out) and SQ(min;in), of the individual outdoor LD signals and of the indoor LD signals may be needed to adequately determine the LD unit present location. If an adequate number p of outdoor LD signals are available, but fewer than q indoor LD signals, are available for determination of the LD unit present location, the outdoor LD signals (only) are used for this purpose. If an adequate number q of indoor LD signals are available, but fewer than p outdoor LD signals, are available for determination of the LD unit present location, the indoor LD signals (only) are used for this purpose. If an adequate number (at least p) of outdoor LD signals and an adequate number (at least q) of indoor LD signals are available for determination of the LD unit present location: (1) the outdoor LD signals are used to determine the LD unit present location if $$SQ(\text{out})/SQ(\text{min;out}) > SQ(\text{in})/SQ(\text{min;in}); \quad (15A)$$

(2) the indoor LD signals are used to determine the LD unit present location if $$SQ(\text{out})/SQ(\text{min;out}) < SQ(\text{in})/SQ(\text{min;in}); \quad (15B)$$

and (3) a selected combination the LD unit present location, based on the outdoor signals only, and the LD unit present location, based on the indoor LD signals only, is used for an optimized LD unit present location if $$SQ(\text{out})/SQ(\text{min;out}) = SQ(\text{in})/SQ(\text{min;in}). \quad (15C)$$

(4) The system declines to determine the LD unit present location if an adequate number (at least p) of outdoor LD signals is not available and an adequate number (at least q) of indoor LD signals is not available.

Figure 3:
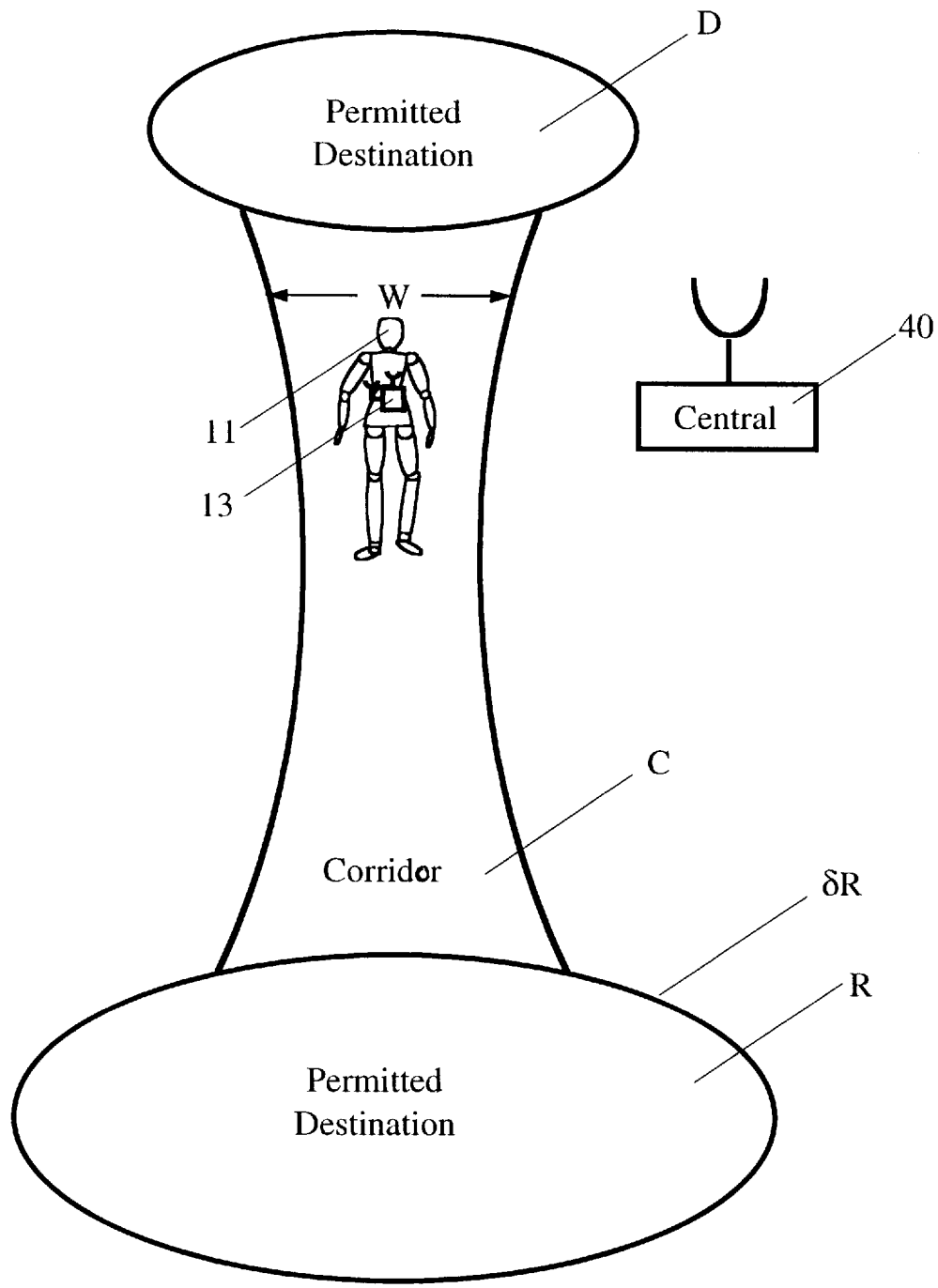
FIG. 3 is a schematic view illustrating use of the invention to provide a corridor C from the site confinee's usual confinement site R to a permitted destination D that is spaced apart from the site R.

From time to time, the confinee 11 may need to leave the site R for legitimate needs, such as a visit to his/her physician, a visit to a hospital for emergency or elective medical treatment, or to purchase food or other necessary personal items. In such instance, the range of location coordinates for the site R can be expanded, temporarily, by prearrangement with the central station 40 to include a corridor C connecting the site R to the physician's office or other legitimate destination D for the confinee, as indicated in FIG. 3. When the confinee 11 returns to the original site R after the prearranged visit, the corridor C and destination D are deleted and the permitted site again becomes the original site R. Alternatively, the confinee 11 can be moved from the first permitted site R to the destination site D, and the first permitted site R and the corridor C can be deleted after the confinee arrives at the new permitted site D. The width W of the corridor C may be as little as 10–15 meters (the width of an average residential street) by suitable (re)programming of a computer that is part of the LD signal receiver/processor 17. Alternatively, the width W may be much greater to allow for use of any of two or more alternative paths connecting the original site R to the destination D within the corridor C. The width W may vary along the corridor C. The movements of the confinee 11 in the corridor C may be timed, and the confinee may be required to move according to a selected time schedule, with time tolerances optionally included to compensate for reasonable but unexpected time delays in movement between the permitted site R and the destination site D.

Alternatively, the confinee 11 may be under court order or other constraint to avoid certain locales, for example, the homes and/or offices of persons also involved in crimes or other activities for which the confinee was arrested or confined. This could also include the home and/or office of an estranged spouse, victim or witness to commission of a crime or other activity in which the confinee 11 was involved. In this instance, the range of location coordinates for the confinement site would be supplemented, at the LD signal receiver/processor 17 and/or at the central station 40, by a range of location coordinates for an exclusion zone R', surrounding and including each home, office and/or other facility that the confinee must avoid at all times, as illustrated in FIG. 4. If the confinee II leaves the site R and crosses a designated boundary δR' of the exclusion region R', the LD unit 13 notes its present location at the exclsuion site R' and notifies the central station 40 of this development by another silent radiowave alarm, and police or other authorities can be dispatched to intercept the confinee. Optionally, the LD unit could cause the confinee to become disabled, for example by rendering the confinee unconscious, using trans-dermal application across the arrestee's skin of a strong sedative or depressant. Transdermal application devices are available from Alza Corp., Palo Alto, Calif., and from other manufacturers in this field.

Figure 5:
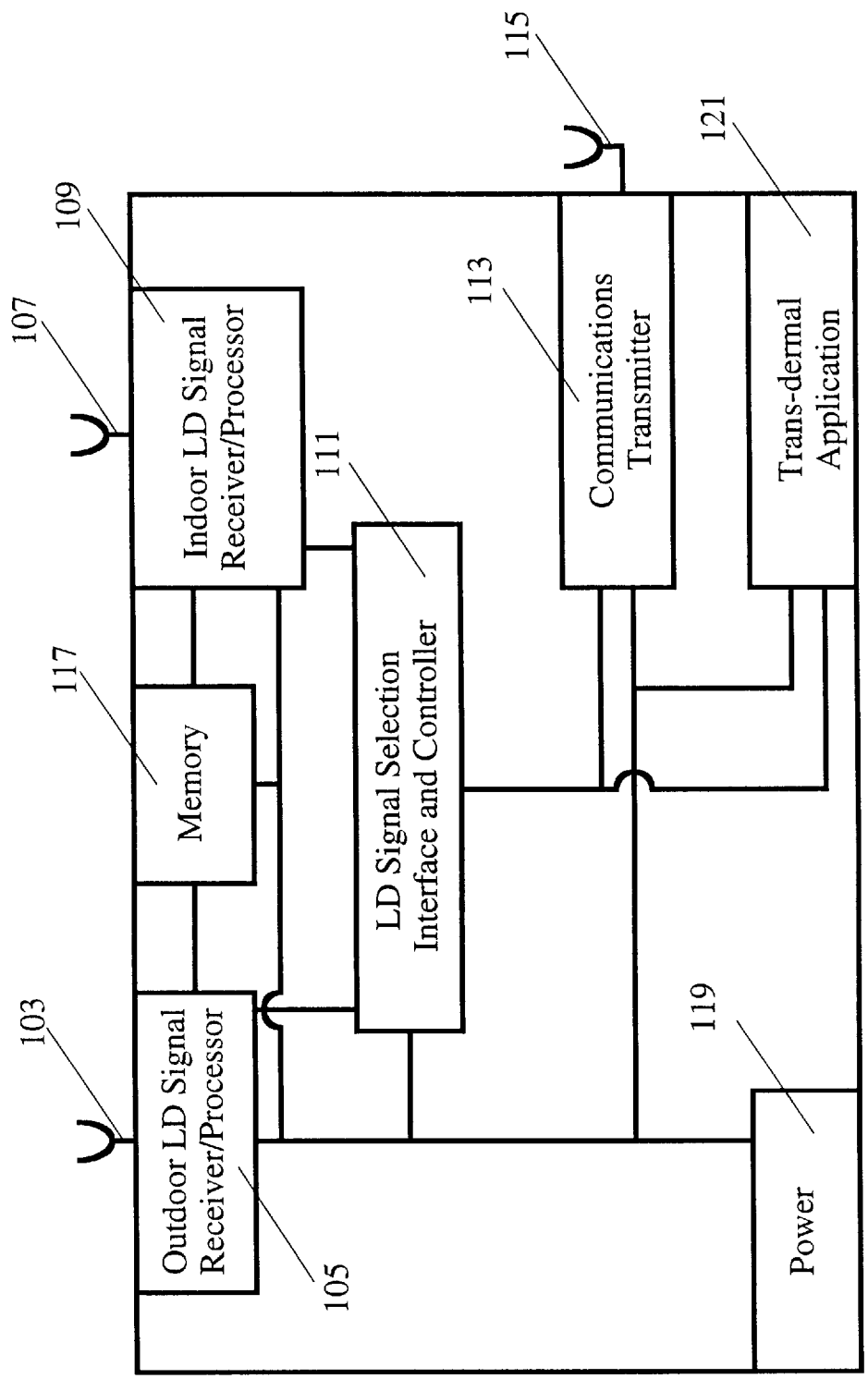
FIG. 5 is a schematic view of a location determination unit that receives and processes indoor LD signals and outdoor LD signals and that determines which set of signals shall be used to determine location of the LD unit.

FIG. 5 illustrates components of an LD unit 13 that are suitable for practicing the invention. The LD unit includes a portable housing 101, an outdoor LD signal antenna 103 and an outdoor LD signal receiver/processor 105 that receive and process outdoor LD signals, an indoor LD signal antenna 107 and an indoor LD signal receiver/processor 109 that receive and process indoor LD signals, and an LD signal selection interface 111 that implements a choice of the outdoor LD signals and/or of the indoor LD signals to determine the LD unit present location, by the approach outlined above. The LD unit 13 also includes a communications transmitter or transceiver 113 and associated communications antenna 115 that are programmed to receive an alarm signal from the outdoor LD signal receiver/processor 105 or from the indoor LD signal receiver/processor 109, indicating the present location of the LD unit 13 is outside the confinement site R and that the confinee 11 has not received permission beforehand to move outside the site R, and transmitting this alarm signal to the intermediate transceiver 30 or directly to the central; station 40. Optionally, the communications transceiver 113 is also programmed to receive a location interrogation signal (LIS), directly or indirectly, from the central station 40, to obtain the LD unit present location and to transmit this present location information to the intermediate transceiver 30 or directly to the central station 40 (FIG. 1). Optionally, the outdoor LD signal receiver/processor 105 and/or the indoor LD signal receiver/processor 109 are connected to a memory unit 117, for receiving and storing LD unit present location information and relevant related information. The LD unit 13 also includes a power supply 119 that provides power for one or more of the other components.

Optionally, the LD unit 13 also includes a trans-dermal application module 121, connected to and controlled by the outdoor LD signal receiver/processor 105 and/or by the indoor LD signal receiver/processor 109, that can be activated to deliver a drug to the confinee's body and thereby disable the confinee, if the LD unit 13 present location is within an exclusion zone R'.

The outdoor LD signal receiver/processor 105 and the indoor LD signal receiver/processor 109 contain the coordinates of the confinement site R and/or of the site boundary δR. The LD unit present location coordinates are compared with the range of location coordinates for the site R to determine whether the LD unit is on the site R or is outside the site R. If the LD unit present location is outside the site R, the LD unit 13 next checks whether the confinee II has obtained permission beforehand to leave the site R; if no such permission has been obtained, an alarm signal is transmitted.

Optionally, the LD unit 13 can also determine and transmit the LD unit present location, in addition to transmitting the alarm signal.

Figure 6:
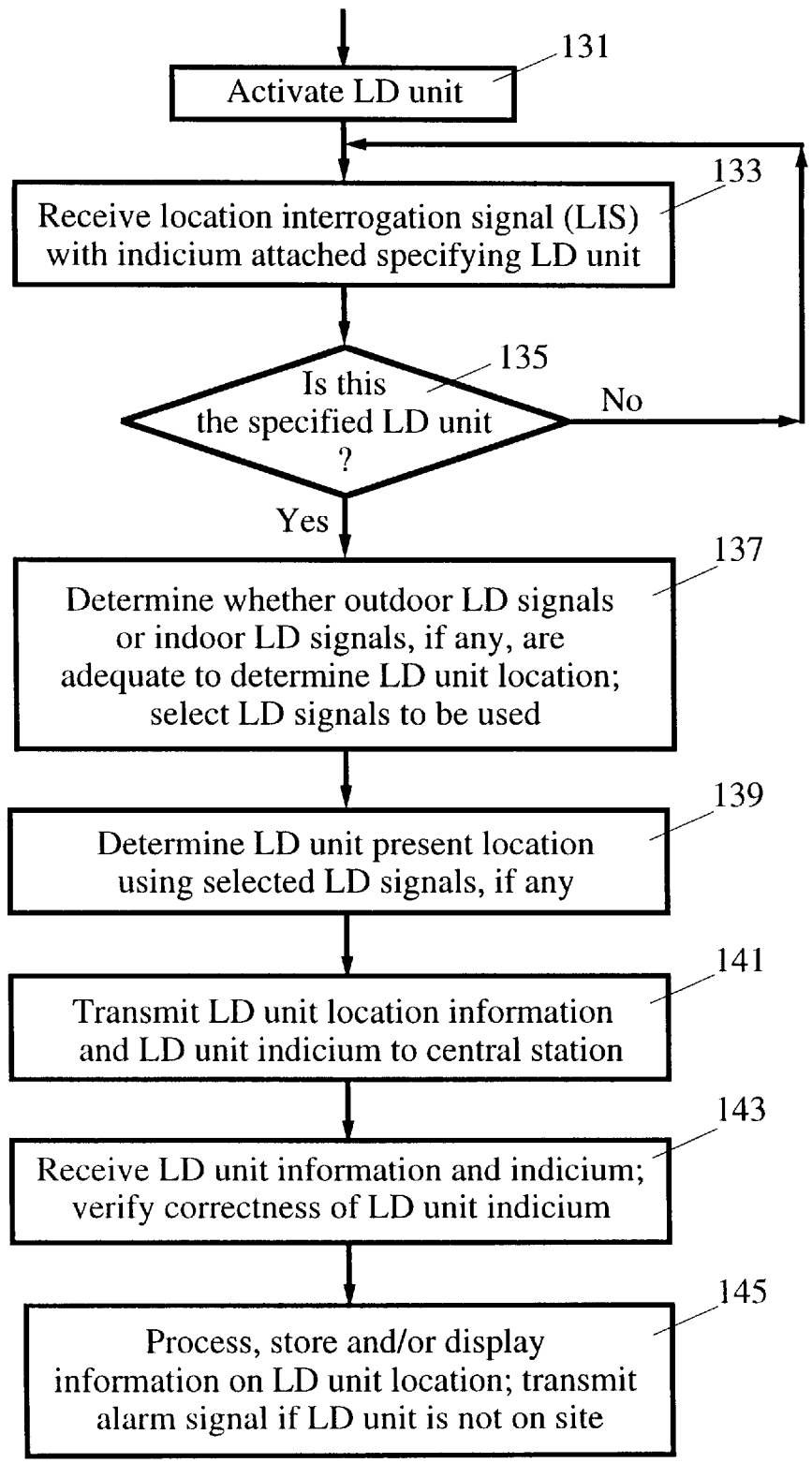
FIGS. 6 and 7 are flow charts of procedures for practicing the invention.

FIG. 6 is a flow chart of a procedure that can be used to determine the present location of the confinee 11, where the system receives and responds to receipt of a location interrogation signal from the central station 40. In step 131, the LD system is activated and made ready to determine the present location of a confinee 11. The LD system receives a location interrogation signal (e.g., "Where are you?") from the central station or another interrogator in step 133, with an identifying label, tag or indicium attached that specifies the identified confinee 11, or specifies the LD unit 13 carried by that person. In step 135, each LD unit 13 determines if it is the LD unit specified by the central station's interrogation signal. If a given LD unit is not the specified unit, that LD unit ignores this interrogation signal and recycles until receipt of the next location interrogation signal. If the LD unit carried by the identified confinee 11 is the specified unit, this LD unit optionally determines whether the outdoor LD signals or the indoor LD signals, if any, are adequate and are to be used to determine the present location of the LD unit, in step 137.

Assuming that the outdoor LD signals and/or the indoor LD signals are adequate to determine the LD unit present location of the LD unit 13, the LD unit determines the LD unit present location, in step 139, using the selected LD signals. In step 141, the LD unit transmits to the central station the last location fix computed by that LD unit and any other relevant and available information on the identified confinee's condition or status. Preferably, the specified LD unit transmits the requested information to the central station in a time slot (of length 10–200 msec) allocated for this response. Preferably, the responding LD unit also includes a label, tag or other indicium identifying the responding LD unit. The central station receives the response signal from the LD unit and verifies that this signal carries the correct LD unit indicium, in step 143 (optional). In step 145 (optional), the central station processes, stores and/or visually or audibly displays information on the specified LD unit present location and transmits an alarm signal if the LD unit 13 is not within the site R, absent permission beforehand to leave the site.

This procedure would be followed irrespective of whether the LD unit 13 is presently inside or outside a building or other structure. Alternatively, the LD unit can partly process the outdoor LD signals and/or the indoor LD signals and can transmit this partly processed information to the central station 40 for further signal processing and determination of the responding LD unit present location. As a second alternative, the LD unit can automatically retransmit, unprocessed, suitable location information (timing, relative phases, etc.) that the LD unit is receiving from each of the outdoor and/or indoor LD signal sources and allow the central station to do all LD signal processing to determine the LD unit present location.

Figure 7:
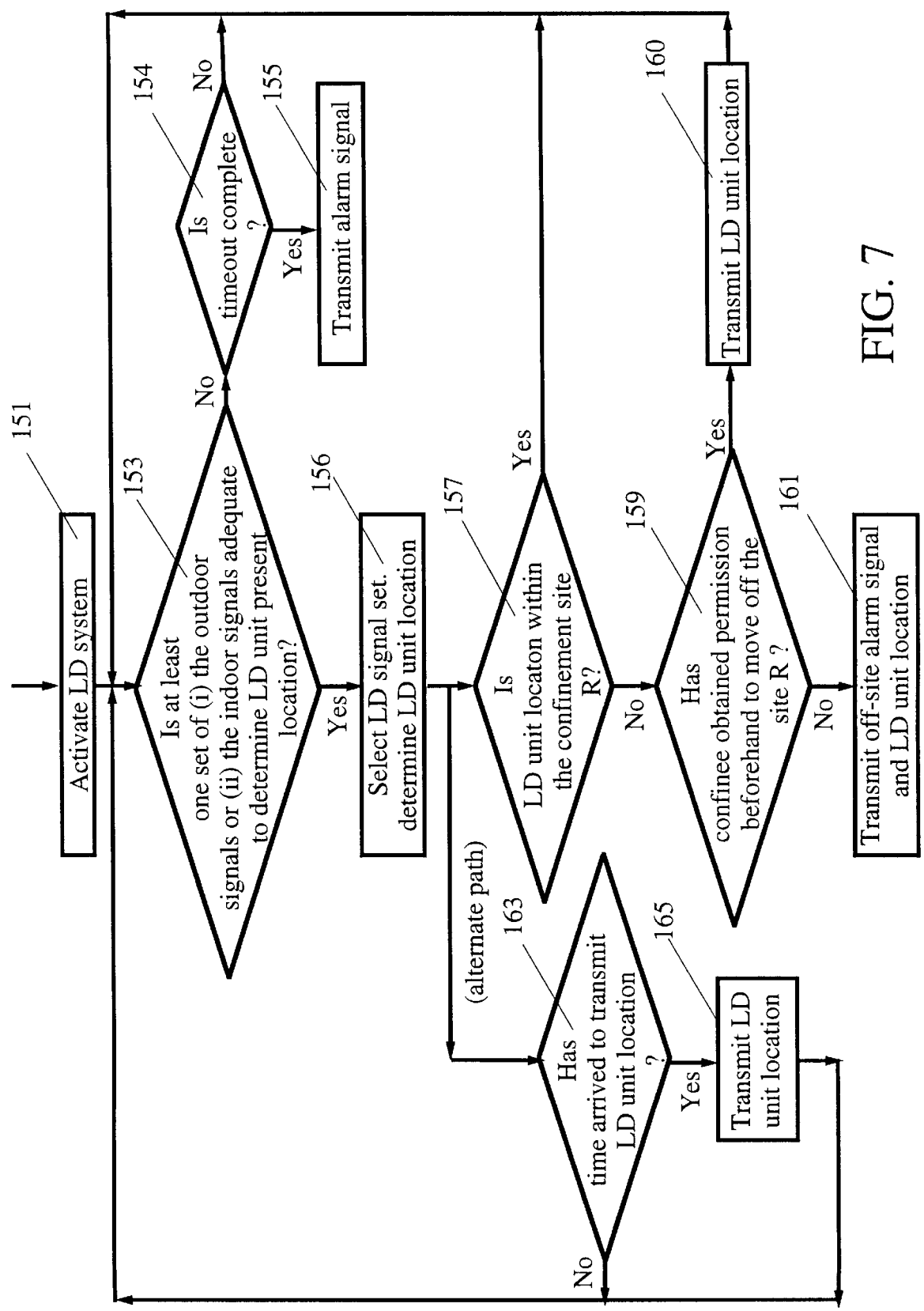

FIG. 7 is a flow chart of a procedure that can be used to determine the present location of the confinee, either at a sequence of selected times or when the LD unit determines that its present location is outside the confinement site R. In step 151, the LD system is activated and made ready to determine the present location of a confinee 11. In step 153, the LD unit determines whether the outdoor LD signals and/or the indoor LD signals are adequate to determine the LD unit present location. If the answer to the question in step 153 is "no," the system determines, in step 154, if a timeout interval is completed; the length of the timeout interval might be 15–45 sec. If the answer to the question in step 154 is "no," the system recycles to step 153. If the answer to the question in step 154 is "yes," the system transmits an alarm signal, indicating that the LD unit is not functioning properly, in step 155. If the answer to the question in step 153 is "yes," the system continues to step 156 and determines the LD unit present location.

In step 157, the system determines whether the LD unit present location is within the confinement site R. If the answer to the question in step 157 is "yes," the system recycles to step 153. If the answer to the question in step 157 is "no," the system determines, in step 159, whether the confinee has obtained approval beforehand to move off the site R. If the answer to the question in step 159 is "yes," the LD unit transmits its present location (optional) and the system recycles to step 153. If the answer to the question in step 159 is "no," the LD unit transmits an alarm signal and optionally transmits its present location, in step 161, and recycles to step 153.

As an alternative to steps 157 and 159, the system can proceed from step 155 to step 163 and determine whether one of a selected sequence of times has arrived at which the LD unit should report its present location. If the answer to the question in step 163 is "no," the system recycles to step 153. If the answer to the question in step 163 is "yes," the LD unit transmits an alarm signal and optionally transmits its present location, in step 165, and the system recycles to step 153.

Although the preceding discussion has implicitly focused on use of the invention to monitor the location(s) of one or more site arrestees, the invention can also be used to monitor the location(s) of one or more confinees at a hospital or mental health institution, to monitor the location(s) of one or more workers at an emergency service site (fire, explosion, flood, toxic cleanup, etc.), or to monitor the location(s) of one or more persons at any site where knowledge of these moment-to-moment locations are important.

We claim:

1. A method for monitoring the location of a site confinee with reference to a permitted site that has at least one structure on the site, the method comprising the steps of:

designating a site, having a curve of arbitrary shape as a site boundary and having at least one structure thereon, as a permitted site;

positioning a location determination (LD) unit on the body of a site confinee to determine the location of the LD unit from receipt of electromagnetic signals at the LD unit;

receiving outdoor LD signals at the LD unit from each of a first set of at least three outdoor LD signal sources, whose locations are known with high accuracy and are spaced apart from each other outside the structure, where each outdoor LD signal has an indicium that identifies the source of the signal;

receiving indoor LD signals at the LD unit from each of a first set of at least three outdoor LD signal sources, whose locations are known with high accuracy and are spaced apart from each other inside the structure, where each indoor LD signal has an indicium that identifies the source of the signal;

selecting a preferred set of LD signals from the first set of LD signals and the second set of LD signals, by applying at least one of a selected signal strength criterion and a selected signal quality criterion to the first set and to the second set of LD signals, and using the preferred set of LD signals to determine the location of the LD unit;

for each of a selected sequence of interrogation times, determining the present location of the LD unit, and determining whether the LD unit is within the permitted site at each such interrogation time; and communicating at least one of (i) a selected alarm signal and (ii) information on a recent location of the LD unit, when at least one of a selected group of conditions is present, where the selected group of conditions includes at least one of (A) the condition that the present location of the LD unit is not within the permitted site for at least one of the interrogation times, and the confinee has not made arrangements beforehand to leave the permitted site and to travel in a region not within the permitted site and (B) the condition that the LD unit receives a selected location interrogation signal.

2. The method of claim 1, wherein said step of receiving said second set of said LD signals comprises the steps of:

generating and transmitting each of said second set of said LD signals as a radiowave signal having a selected frequency that is no greater than about 100 kHz; and recieving said second set of said LD signals at said LD unit.

3. The method of claim 2, wherein said step of determining said present location of said LD unit by using said second set of LD signals comprises the steps of:

determining the relative phases of each of said second set of LD signals received at said LD unit; and estimating the location of said LD unit from the relative phases and from said known locations of said indoor LD signal sources.

4. The method of claim 3, wherein said step of determining said relative phases of said second set of said LD signals comprises the steps of:

receiving each of said indoor LD signals at a signal monitor whose location, within or adjacent to said building, is known with high accuracy; and determining said relative phases from the phase of at least one of said indoor LD signals received at the signal monitor and from the location of said indoor LD signal source of said one indoor LD signal relative to the location of the signal monitor.

5. The method of claim 2, further comprising the steps of:

providing each of said first set of said LD signals with a different radiowave frequency; and using as said indicium that identifies said source of said indoor LD signal a measure of the radiowave frequency of said indoor LD signal.

6. The method of claim 1, wherein said step of determining whether said LD unit is within said permitted site comprises the step of providing said LD unit with an electronically sensible map of a selected geographic region that indicates the range of location coordinates of said permitted site or of said boundary of said permitted site.

7. The method of claim 1, wherein said step of selecting said preferred set of LD signals comprises the steps of:

determining and applying a measure of signal strength for said first set of LD signals received at said LD unit;

determining and applying a measure of signal strength for said second set of LD signals received at said LD unit; and choosing said first set of said LD signals, or said second set of said LD signals, to determine said location of said LD unit according as the measure of signal strength for said first set of said LD signals is greater than, or is less than, the measure of signal strength for said second set of said LD signals.

8. The method of claim 7, wherein selecting said preferred set of LD signals further comprises the steps of:

determining a signal strength, SS(k;out) (k=1, 2, . . . , N(out)), for each of a selected number, N(out), of said outdoor LD signals received at said LD unit, and determining an average, SS(avg;out), of the signal strengths SS(k;out);

determining a signal strength, SS(k;in) (k=1, 2, . . . , N(in)), for each of a selected number, N(in), of said indoor LD signals received at said LD unit, and determining an average, SS(avg;in), of the signal strengths SS(k;in);

computing a first ratio, SS(avg;out)/SS(min;out), and a second ratio, SS(avg;in)/SS(min;in), where SS(min;out) and SS(min;in) are selected values of signal strength for said outdoor LD signals and for said indoor LD signals, respectively;

choosing said outdoor LD signals as said preferred set of LD signals if the first ratio is greater than the second ratio and N(out) is at least as large as a selected number, N(min;out), for said outdoor LD signals; and choosing said indoor LD signals as said preferred set of LD signals if the second ratio is greater than the first ratio and N(in) is at least as large as a selected number, N(min;in), for said indoor LD signals.

9. The method of claim 8, further comprising the steps of:

choosing said average, SS(avg;out), for said N(out) outdoor LD signals from the class of signal strength averages consisting of $$SS(avg;out) = \sum_{k=1}^{N(out)} SS(k;out)/N(out)$$

and $$SS(avg;out) = \left\{ \prod_{k=1}^{N(out)} SS(k;out) \right\}^{1/N(out)};$$

and choosing said average, SS(avg;in), for said N(in) indoor LD signals from the class of signal strength averages consisting of $$SS(avg;in) = \sum_{k=1}^{N(in)} SS(k;in)/N(in)$$

and $$SS(avg;in) = \left\{ \prod_{k=1}^{N(in)} SS(k;in) \right\}^{1/N(in)}.$$

10. The method of claim 1, wherein said step of selecting said preferred set of LD signals comprises the steps of:
  determining and applying a measure of signal quality for said first set of LD signals received at said LD unit;
  determining and applying a measure of signal quality for said second set of LD signals received at said LD unit; and
  choosing said first set of said LD signals, or said second set of said LD signals, to determine said location of said LD unit according as the measure of signal quality for said first set of said LD signals is greater than, or is less than, the measure of signal quality for said second set of said LD signals.

11. The method of claim 10, wherein selecting said preferred set of LD signals further comprises the steps of:
  determining a measure of signal quality, SQ(k;out) (k=1, 2, . . . , N(out)), for each of a selected number, N(out), of said outdoor LD signals received at said LD unit, and determining an average, SQ(avg;out), of the signal qualities SQ(k;out);
  determining a measure of signal quality, SQ(k;in) (k=1, 2, . . . , N(in)), for each of a selected number, N(in), of said indoor LD signals received at said LD unit, and determining an average, SQ(avg;in), of the signal qualities SQ(k;in);
  computing a first ratio, SQ(avg;out)/SQ(min;out), and a second ratio, SQ(avg;in)/SQ(min;in), where SQ(min;out) and SQ(min;in) are selected values of signal quality for said outdoor LD signals and for said indoor LD signals, respectively;
  choosing said outdoor LD signals as said preferred set of LD signals if the first ratio is greater than the second ratio and N(out) is at least as large as a selected number, N(min;out), for said outdoor LD signals; and
  choosing said indoor LD signals as said preferred set of LD signals if the second ratio is greater than the first ratio and N(in) is at least as large as a selected number, N(min;in), for said indoor LD signals.

12. The method of claim 11, further comprising the steps of:
  choosing said average, SS(avg;out), for said N(out) outdoor LD signals from the class of signal strength averages consisting of $$SQ(avg;out) = \sum_{k=1}^{N(out)} SQ(k;out)/N(out)$$

and $$SQ(avg;out) = \left\{ \prod_{k=1}^{N(out)} SQ(k;out) \right\}^{1/N(out)};$$

and choosing said average, SS(avg;in), for said N(in) indoor LD signals from the class of signal strength averages consisting of $$SQ(avg;in) = \sum_{k=1}^{N(in)} SQ(k;in)/N(in)$$

and $$SQ(avg;in) = \left\{ \prod_{k=1}^{N(in)} SQ(k;in) \right\}^{1/N(in)}.$$

13. The method of claim 1, further comprising the steps of:
  selecting a second site, which has a second site boundary of arbitrary shape and is spaced apart from said first permitted site, and selecting a selected corridor region that extends between and is connected to said permitted site and the second site;
  redefining, for a first selected time interval $t1 \leq t \leq t2$ ($t2 \leq t1$), a second permitted site; and
  redefining, for a second selected time interval $t3 \leq t \leq t4$ ($t2 \leq t3 \leq t4$), a third permitted site to include at least one said first permitted site and the second site.

14. The method of claim 1, further comprising the steps of:
  selecting a second site, which has a second site boundary of arbitrary shape and is spaced apart from said first permitted site, as an exclusion site where said confinee is not permitted to go;
  determining, at a selected sequence of interrogation times, whether said LD unit is within the exclusion site at each such interrogation time; and
  communicating an alarm signal if said LD unit location is within the exclusion site.

15. The method of claim 14, further comprising the step of causing said LD unit to deliver to said confinee's body a chemical that temporarily disables said confinee, when said present location of said LD unit is determined to be within said exclusion site.

16. method of claim 1, wherein said step of positioning said LD unit on said body of said site confinee further comprises the step of providing an attachment mechanism for attaching said LD unit to said confinee's body so that said LD unit cannot be removed or interfered with except by special locking mechanism means.

17. The method of claim 16, wherein said step of positioning said LD unit on said body of said site confinee further comprises the step of transmitting a second selected alarm signal whenever said LD unit senses that an attempt is being made to remove or interfere with operation of said LD unit.

18. The method of claim 1, further comprising the step of choosing signal sources for said outdoor LD signals from a class of LD signal systems consisting of a Loran system, an FM subcarrier system, a Global Positioning System and a Global Orbiting Navigational Satellite System.

* * * * *